2,847,449
Patented Aug. 12, 1958

United States Patent Office 2,847,449

VAPOR PHASE PRODUCTION OF ACRYLONITRILE

Frank Maslan, Newton Highlands, and Edgar A. Stoddard, Jr., Randolph, Mass., assignors to Escambia Chemical Corporation, Pace, Fla., a corporation of Delaware No Drawing. Application May 14, 1957
Serial No. 658,950

9 Claims. (Cl. 260—465.3)

This invention relates to the production of chemicals and in particular to an improved process for the production of acrylonitrile. The application is, in part, a continuation of copending application Serial No. 542,474, filed October 24, 1955.

A principal object of the present invention is to produce high yields of acrylonitrile readily and cheaply by reacting hydrogen cyanide with acetylene in the vapor phase in the presence of a suitable catalyst.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description.

The present invention is directed to the vapor phase production of acrylonitrile by passing an acetylene stream and hydrogen cyanide over a suitable catalyst for reaction at an elevated temperature. As is known, there is a large temperature rise due to the heat release of this reaction. If all of the reactants are fed preheated into the inlet of a single reactor and are used up in the reaction, the temperature of the reaction gases is too high and causes a significant decrease in the conversion to acrylonitrile due to deleterious side reactions. Although in actual practice complete conversion of the reactants is not achieved, the temperature rise which occurs is such as to cause control difficulty.

In one embodiment of the present invention, better temperature control is achieved by introducing or injecting hydrogen cyanide or acetylene or mixtures of the reactants into the reactor at one or more points. The temperature of the substance injected is significantly below the reaction temperatures so as to obtain a better reaction and temperature control. This injection cools the reaction gases at the cross section of the injection point. By suitable proportioning of the feed gases and injection of cool reactants, it is possible to maintain the reaction at the most desirable temperature levels for maximum conversions and yields.

In another embodiment of the invention, the acetylene stream utilized is a dilute acetylene stream which contains less than about 15 percent acetylene. The preferred acetylene streams can be obtained by diluting pure acetylene with diluents such as nitrogen, hydrogen, carbon oxides, mixtures thereof and the like. Acetaylene streams containing less than about 15 percent acetylene are produced directly by such well-known methods as the "Wulff" and "Sachsse" processes and like processes which utilize hydrocarbons or mixtures thereof as the starting materials.

One well-known method for producing acetylene streams containing less than about 15 percent acetylene is the "Wulff" process. This process essentially involves the thermal cracking of hydrocarbon gases at a high temperature. The "Wulff" process and modifications thereof are fully described and claimed in U. S. Patents 1,880,307, 1,880,308, 1,880,309, 1,966,779, 2,037,056, 2,236,534, 2,236,535, 2,236,555, 2,319,679, 2,475,093 and many others.

Another well-known method for producing dilute acetylene is the "Sachsse" process. This process involves the incomplete combustion of a hydrocarbon or mixtures of hydrocarbons to form acetylene stream containing less than about 15 percent acetylene. A more detailed discussion of the "Sachsse" process may be found in U. S. Patents 2,195,227, 2,235,749, and 2,664,450.

The composition of the dilute acetylene streams obtained from the above processes depends, to a great extent, upon the hydrocarbon or hydrocarbons employed as the starting material. However, these streams generally contain various proportions of acetylene (in amounts of less than about 15 percent), carbon oxides, hydrogen, nitrogen and unsaturated and/or saturated hydrocarbons. The reaction between acetylene and hydrogen cyanide is carried out at a temperature within the range of from about 450° C. to 700° C. and in the presence of an inert support and preferably a porous carbonaceous support impregnated with from about 3 percent to about 15 percent by weight of either an alkali metal hydroxide, cyanide or carbonate.

Specific detailed methods of carrying out the present invention are set forth in the following non-limiting examples.

Example I

An aluminized reactor 76 inches in length with an internal diameter of three inches was fitted with side ports spaced at about 6 inch intervals along the length of the reactor. The reactor contained 8000 grams of a deoxygenated porous charcoal support impregnated with about 10 percent by weight of sodium hydroxide. A stream of dilute acetylene and hydrogen cyanide was passed through the reactor containing the catalyst. The reactor was maintained at a temperature of about 620° C. and the gases passed through the reactor at a space velocity of about 580 hr.$^{-1}$ (STP). The mole ratio of acetylene to hydrogen cyanide was 0.8 with the amount of acetylene in the feed stream amounting to about 8 percent. The remainder of the stream consisted of hydrogen and nitrogen. During the run a hot spot of about 635° C. developed about 16 inches below the top of the catalyst bed. Admission of 5.5 percent of cold (room temperature) feed gases 13 inches below the top of the bed was sufficient to depress the hot spot about 7° C. in about 20 minutes. After 59 hours the run was terminated. The conversion of acetylene to acrylonitrile was 67.1 percent based on acetylene while the yield was 85.8 percent based on hydrogen cyanide.

Example II

An aluminized reactor 96 inches in length with an internal diameter of three inches was provided with three side ports spaced 38.0, 53.5 and 69 inches respectively from the top of the reactor. The reactor contained 8000 grams of a deoxygenated porous charcoal support impregnated with about 10 percent by weight of sodium hydroxide. The feed gases consisting of a mixture of hydrogen cyanide and a dilute acetylene stream containing about 8 percent acetylene were distributed to the catalyst bed through the three side ports, as well as to the top of the reactor. For a period of 20 hours, the distribution of feed gases was 50 percent to the top, 30 percent to the highest port line, 38.0 inches from the top of the reactor, and 10 percent each to the remaining two ports. The reactor was heated to a temperature of about 620°

C. and the gases passed therethrough at a space velocity of about 550 hr.$^{-1}$ (STP). The mole ratio of acetylene to hydrogen cyanide in the feed gases to the reaction was 0.8. The temperature control of the reaction was excellent. Several times during the run, hot spots were deliberately induced. It was found that these hot zones could be simply controlled by admitting cold (room temperature) gas feed to the hot area. Thus 10 percent of the feed gas admitted to a section of the catalyst bed operating at about 677° C. lowered the temperature in that zone 38°–65° C. in 15 to 20 minutes. A conversion of acetylene to acrylonitrile of 78.7 percent was obtained while the yield based on hydrogen cyanide was 67.3 percent.

The process of the present invention preferably comprises the steps of reacting a mixture of hydrogen cyanide and acetylene in the vapor phase in the presence of an inert porous support which is preferably charcoal which has been deoxygenated. The charcoal is preferably first impregnated with from about 3 percent to 15 percent by weight of an alkali metal hydroxide, cyanide or carbonate. In a preferred embodiment, the charcoal is impregnated with about 10 percent by weight of an alkali metal hydroxide, the preferred alkali metal hydroxide being sodium hydroxide.

In a preferred aspect of the invention, the porous support is a softwood charcoal due to its lower cost. This charcoal is conditioned for use as a catalyst support by heating in the range of 500° C. to 900° C. and passing hydrogen over the heated charcoal until substantially all the adsorbed and combined oxygen has been removed. The resulting deoxygenated charcoal is impregnated with an alkali metal hydroxide, cyanide or carbonate.

The temperature range in the reactor can vary from about 450° C. to about 700° C. The optimum temperature range for the reaction, however, is dependent upon many factors such as, for example, the size of the reactor. The space velocity may vary from about 100 hr.$^{-1}$ (STP) to about 1000 hr.$^{-1}$ (STP), preferred space velocities being on the order of between about 300 and 800 hr.$^{-1}$ (STP) at reaction temperatures between about 525° C. and 630° C.

The molar ratio of acetylene to hydrogen cyanide may be varied quite widely between about 0.5:1 to about 1.6:1 and higher.

In the above examples, specific operating conditions have been given. These conditions, however, are subject to considerable variation without departing from the scope of the invention. For example, the pressure range in the reactor may vary from about atmospheric pressure to about 100 pounds per square inch. Other catalysts, such as oxygen-free, porous charcoal supports impregnated with an alkali metal carbonate or cyanide, can be employed in the reaction. While the reaction has been described as being carried out in the presence of appreciable quantities of hydrogen and nitrogen, it is equally applicable to reactions carried out in the presence of other diluents.

In the examples cited above, a dilute stream of acetylene was employed. The above examples, illustrating the use of an acetylene stream containing on the order of about 8 percent acetylene and an appreciable quantity of hydrogen, shows that high yields of acrylonitrile with low yields of undesired propionitrile can be obtained with good temperature control. The presence of materials such as methane, ethylene, nitrogen and carbon monoxide in a stream of reacting gases does not materially affect the behavior of the catalyst in producing high yields of acrylonitrile. Although this invention has been described in connection with the use of dilute acetylene streams, it is also applicable to concentrated acetylene streams.

Another aspect of the present invention is directed to the vapor phase production of acrylonitrile by first passing a dilute acetylene stream and hydrogen cyanide over a suitable catalyst for reaction at an elevated temperature. The acetylene is preferably present in an amount which is greater than that stoichiometrically necessary to react completely with the hydrogen cyanide fed; thereafter there is added to the resulting reaction mixture an amount of hydrogen cyanide in excess of that stoichiometrically necessary to react with the remaining acetylene, and this mixture is then passed over additional catalyst in at least one separate and successive operation.

The mole ratio of acetylene to hydrogen cyanide in the first reaction is maintained under conditions which favor maximum conversion of hydrogen cyanide to acrylonitrile. Thus, it is preferred to employ an amount of acetylene which is in excess of that stoichiometrically necessary to completely combine or react with the hydrogen cyanide present. The mole ratio of acetylene to hydrogen cyanide in the second reaction is preferably such that the amount of hydrogen cyanide is in excess of that stoichiometrically necessary to react with the remaining acetylene.

If desired, the reaction can be carried out in a single reactor in such a manner as to effect a two-stage reaction. Also, the reaction can be carried out in more than two stages. In one method of operating, for example, the first temperature rise can be kept to a controllable level by initially feeding into a first reactor a gaseous mixture of acetylene with a minor fraction of the stoichiometric amount of hydrogen cyanide required to form acrylonitrile. After this portion of the reaction has taken place, additional quantities of hydrogen cyanide are thereafter introduced into the first reactor at one or more intermediate points. The quantity of hydrogen cyanide present, however, is maintained such that the acetylene is always present (in the first reactor) in excess of the stoichiometric amount required to react with the hydrogen cyanide. In order to maintain this preferred ratio, additional quantities of acetylene may also be injected into the reactor at one or more intermediate points. This new feed of hydrogen cyanide and/or acetylene is preferably at a low temperature so as to cause a decrease of from about 10° C. to 50° C. in the temperature of the reaction mass. This sufficiently decreases the reaction temperature so that further conversion results at the most desirable temperature levels. It is obvious that this multi-injection proposal of the present invention is suitable not only for the two-stage reaction described herein but also for the one-stage reaction between acetylene and hydrogen cyanide as shown in the examples.

Since certain changes may be made in the above process without departing from the scope of the invention herein involved, it is intended that all matter contained in the above description shall be interpreted as illustrative and not in a limiting sense.

What is claimed is:

1. A process for the vapor phase production of acrylonitrile which comprises introducing acetylene and hydrogen cyanide into the inlet of a reactor, said reactor containing an inert support carrying a catalyst selected from the group consisting of the alkali metal hydroxides, carbonates and cyanides and being maintained at a temperature between about 450° C. and 700° C., adding further quantities of at least one reactant maintained at a temperature below 450° C. to the reactor at a plurality of points distributed along the length of the reactor to maintain proper temperature control of the reaction, and recovering the acrylonitrile formed.

2. A process according to claim 1 wherein further quantities of acetylene and hydrogen cyanide are added to the reactor.

3. A process according to claim 1 wherein further quantities of acetylene are added to the reactor.

4. A process according to claim 1 wherein further quantities of hydrogen cyanide are added to the reactor.

5. The process according to claim 1 wherein quantities of dilute acetylene are added to the reactor.

6. A process according to claim 1 wherein the acetylene introduced at the inlet of the reactor and acetylene added to the reactor at a plurality of points distributed along the length of the reactor is a dilute acetylene stream.

7. A process according to claim 6 wherein the dilute acetylene streams contain less than about 15 percent acetylene.

8. A process according to claim 1 wherein further quantities of at least one reactant maintained on the order of about room temperature are added to the reactor.

9. A process for the vapor phase production of acrylonitrile which comprises introducing acetylene and hydrogen cyanide into the inlet of a reactor, said reactor containing an inert support carrying a catalyst selected from the group consisting of the alkali metal hydroxides, carbonates and cyanides and being maintained at a temperature between about 450° C. and 700° C., and cooling any hot spot formed within the reactor by adding further quantities of at least one reactant maintained on the order of about room temperature to the reactor at a point in close proximity to the hot spot.

References Cited in the file of this patent

UNITED STATES PATENTS

| | | |
|---|---|---|
| 2,385,551 | Spence et al. | Sept. 25, 1945 |
| 2,413,623 | Harris | Dec. 31, 1946 |
| 2,419,186 | Harris et al. | Apr. 15, 1947 |
| 2,502,678 | Sapulding et al. | Apr. 4, 1950 |

OTHER REFERENCES

Migrdichian: "The Chemistry of Organic Cyanogen Compounds," 1947, page 349.